United States Patent [19]

Goldsworthy

[11] 4,125,423

[45] Nov. 14, 1978

[54] REINFORCED PLASTIC TAPERED ROD PRODUCTS AND THE METHOD AND APPARATUS FOR PRODUCING SAME

[75] Inventor: William B. Goldsworthy, Palos Verdes Estates, Calif.

[73] Assignee: Goldsworthy Engineering, Inc., Torrance, Calif.

[21] Appl. No.: 687,148

[22] Filed: May 17, 1976

[51] Int. Cl.$^2$ .......................................... B65H 81/00
[52] U.S. Cl. ................................. 156/428; 156/175; 156/432
[58] Field of Search ........ 156/195, 189, 425, 428–431, 156/173–175, 165, 166; 198/696; 138/144; 242/2, 7.21

[56] References Cited

U.S. PATENT DOCUMENTS

| | | | |
|---|---|---|---|
| 2,766,870 | 10/1956 | Baker et al. | 198/696 X |
| 2,823,154 | 2/1958 | Archer | 156/429 X |
| 3,032,461 | 5/1962 | Baker et al. | 156/432 X |
| 3,249,481 | 5/1966 | Boggs | 156/432 X |
| 3,457,962 | 7/1969 | Shobeut | 138/144 |
| 3,523,052 | 8/1970 | Bolen | 156/86 X |
| 3,549,454 | 12/1970 | Roberts | 156/431 |
| 3,567,542 | 3/1971 | Jackson | 156/172 |

*Primary Examiner*—David A. Simmons
*Attorney, Agent, or Firm*—Romney, Schaap, Golant, Scillieri, Disner & Ashen

[57] ABSTRACT

Reinforced plastic tapered tubular rod products and the method and apparatus for producing the same. Tapered steel mandrels of desired length and cross-sectional shape are connected in endwise alignment to form a continuously moving mandrel structure. The mandrels each have an enlarged head and a tapered nose at the opposite end thereof so that the nose extends into a recess formed in the enlarged head of the next proceeding mandrel. These mandrels are fed through a multiplicity of winding wheels in which filament containing strands issued from spools on the wheels are helically wound upon the mandrels. The winding wheels are individually programmable so that the geometry of the reinforcement can be varied ply by ply to obtain the desired longitudinal thickness and the desired torsional stiffness in the end product. The mandrels are held in their endwise connected alignment and retained between the winding wheels by an upper feeding mechanism in the form of an upper conveyor and a lower conveyor located respectively above and below the winding wheels. The lower sets of winding wheels are provided with shrink tapes which are wound about the outer surface of the reinforcement fibers applied to the reinforcement bands wound on the mandrels. The mandrels are thereafter separated from each other and in such manner that the reinforced plastic products which are resin impregnated and finally cured can be removed from the mandrels and thereupon used in the final end products.

23 Claims, 12 Drawing Figures

REINFORCED PLASTIC TAPERED ROD PRODUCTS AND THE METHOD AND APPARATUS FOR PRODUCING SAME

BACKGROUND OF THE INVENTION

This invention relates in general to certain new and useful improvements in reinforced plastic tubular products and the method and apparatus for producing the same, and, more particularly, to reinforced plastic tubular products which are tapered along their axial length, and the apparatus and method for producing such tapered reinforced plastic tubular products.

In recent years, the use and acceptance of tubes and pipes formed from reinforced plastic materials has received increased prominence. Until recently, only metal tubes were used in various applications, since it was believed that only structural metals were capable of withstanding torsional and bending strengths to which the tubular members were subjected. The advent of reinforced plastic tubular members provided a significant advance in the solution of the problems which were previously solved by the use of tubular metal members.

In view of the increased recognition of the use of reinforced plastic members, there has been much research and development activity in the production of such reinforced plastic members. Generally, such reinforced plastic tubular members have been produced on a continuous mandrel which extends and moves in a horizontal plane past a series of winding wheels capable of winding convoluted patterns of reinforcement material on the continuously moving mandrel. For example, one typical example of such winding mechanism is more fully illustrated and described in U.S. Pat. No. 3,769,127, to Goldsworthy, et al. However, the commercially available conventional apparatus are not capable of winding on reinforcing strand material on tubular mandrels of a tapered shape.

Generally, the filament winding apparatus which have been described in the prior art, as exemplified by the aforementioned U.S. patent, essentially are only capable of winding on mandrels of a constantly sized diameter, and are not capable of effectively winding on mandrels of non-constant cross-sectional shape. One of the typical problems encountered is in winding upon and applying the filament reinforcement to a mandrel of non-constant cross sectional size and shape is that strands which are applied on a subsequent basis tend to be applied at different angles and at different speeds, relative to the movement of the mandrel through the filament winding apparatus. This was deemed to create considerable problems in applying the strands at a constant tension and in the desired pattern.

OBJECTS OF THE INVENTION

It is, therefore, the primary object of the present invention to provide reinforced plastic tubular members of tapered shapes.

It is another object of the present invention to provide an apparatus and method for producing filament reinforced tubular members of tapered shapes.

It is a further object of the present invention to provide a method and apparatus of the type stated which employs a series of interconnected mandrels of tapered shapes which will receive fiber containing strands wound thereupon through a series of successive winding stages.

It is an additional object of the present invention to provide a method and apparatus of the type stated which eliminates the costly need for a large inventory of highly expensive mandrels.

It is also an object of the present invention to provide an apparatus of the type stated which is readily and conveniently adaptable to produce tubular members in a wide variety of sizes and shapes.

It is an additional object of the present invention to provide an apparatus and method of the type stated which is capable of making reinforced plastic tubular products having varying cross-sectional shapes, and which products are capable of being used in the manufacture of a wide variety of devices.

With the above and other objects in view, my invention resides in the novel features of form, construction, arrangement and combination of parts presently described in the claims.

GENERAL DESCRIPTION

The present invention relates in general terms to an apparatus and a method for producing reinforced plastic tubular products having a tapered shape. The apparatus comprises a frame means with a plurality of successively located winding stages operatively mounted on the frame means. A plurality of sources of filament containing reinforcing material is associated with each of these winding steps and is capable of issuing reinforcing material therefrom. The apparatus further includes means for moving a mandrel having a tapered shape equivalent to that of the product to be produced past the successive winding stages. In this way, the reinforcing material which is issued from the sources thereof is wound on the mandrel during movement past the winding stages. The apparatus further includes means for causing relative rotation between the winding stages and the mandrel in order to enable winding of the reinforcing material on the mandrel during movement thereof. In the preferred aspect, the mandrel is moved actually through the winding stages and the winding stages are rotated with respect to the mandrel.

In accordance with the winding of the reinforcing material on the mandrel in the desired geometry, this reinforcing material may be matrix impregnated. Thereafter, the impregnated reinforcing material is cured in order to produce a tubular product. Finally, the tubular product is removed from the mandrel.

In one embodiment of the present invention, the apparatus includes a means for applying a shrinkage tape to the reinforced material, which is located on the mandrel. In the more preferred aspect, the shrinkage tape is issued from two shrinkage tape stages located beyond each of the winding stages in the direction of movement of the mandrel for applying the shrinkage tapes in a cross-wound pattern.

The apparatus of the present invention may be further characterized in that the winding stages each comprise a disc member, with the disc member containing sources of filament containing material. These discs each include a central aperture through which the mandrel moves relative to the winding stages, and the reinforcing material is introduced through the apertures for application to the mandrel. In addition, each of the various winding stages rotate in opposite directions with respect to the next succeeding winding stage in order to cause the reinforcing material from the successive stages to be wound on the mandrel in a crosswound direction, e.g. in opposite directions, so that the reinforcing material is effectively "cross-wound."

Another unique aspect of the present invention resides in the application of the curable resin-matrix to the reinforcing material. In accordance with the present invention, the reinforcing material is applied to the mandrel from the successive winding stages and forms a conically shaped section which is directed rearwardly with respect to the movement of the mandrel. A resin application means is provided in relationship to one of the winding stations for introducing liquid resin into the conically shaped section as formed. This resin is applied in an amount so that the resin-matrix overflows a relatively dense portion of the reinforcing material through the open areas thereof and between the reinforcement material beyond the dense portion. In this way, the resin matrix will flow downwardly toward a conically shaped area formed by the reinforcement material for the next succeeding stages. The resin matrix is applied in an amount sufficient so that the matrix will overflow each of the conically shaped areas thus formed to the next succeeding conically shaped area until the last conically shaped area thus formed has a sufficient amount of resin with no further overflow occurring.

In another embodiment of the present invention, each of the mandrels used are designed with an enlarged head on an opposite diametrically reduced end. A recess in the form of a coupling means is provided in the enlarged head of each of the mandrels in order to receive the diametrally reduced end of the next successive mandrel. A first feeding means is located above the various winding stages and a second feeding means is located below the various winding stages. The upper most feeding means in the form of a converging clamping means engages and moves the endwise connected mandrels past the successive winding stages. The second feeding means also engages the endwise connected mandrels and moves the mandrels from a successive winding stage. In this way, it can be observed that the first and the second mandrel feeding means operate in combination in order to retain the endwise aligned mandrels in their connected relationship during movement past the successive winding stages.

Each of the feeding means comprises a form of clamp which engages and moves the mandrels at areas above and below the successive winding stages. A conveyor chain carries these clamps which exist in the form of fingers, the latter being shiftable into engagement with the mandrels. A guide means, in the form of tapered walls, urges the fingers into engagement with the mandrels as they move downwardly with respect to the successive winding stages.

Another one of the unique aspects of the present invention is that the geometry of the reinforcement material can be varied among the successive stages, so that the reinforcement material may be applied on the tapered mandrels at varying angles and at varying density. This unique system obviates the necessity of an expensive numerical control mechanism or the like. In this case, an individual winding stage drive means is associated with at least certain of the successive winding stages. In addition, a mandrel feed drive means is provided to enable feeding of the mandrels past each successive winding stage. A disc means is operatively rotated in effective relationship to the mandrel feeding means and rotates in effective relationship to the winding stage drive means. The disc means has a shape representative of the shape of the mandrel. A sensor means is operatively associated with the disc means to adjust the rate of application of the reinforcement material to the mandrels, in order to vary the angle of application of the reinforcement material to the mandrels.

The sensor means actually comprises the first sensor means, in the form of light receptors, which are located on one side of and around the periphery of the disc, and second sensor means, in the form of light sources, which is located on the opposite side of the disc and in alignment with the light receptors. In addition, the disc means has a cam shape which is representative of the unfolded shape of a tapered mandrel outer surface. In this way, by varying the position of the sensor means, it is possible to adjust the speed of the drive means of the individual winding stage drives and thereby vary the angle of application and also the rate of application of the reinforcing material to the mandrels.

DESCRIPTION OF THE DRAWINGS

Figure 1:
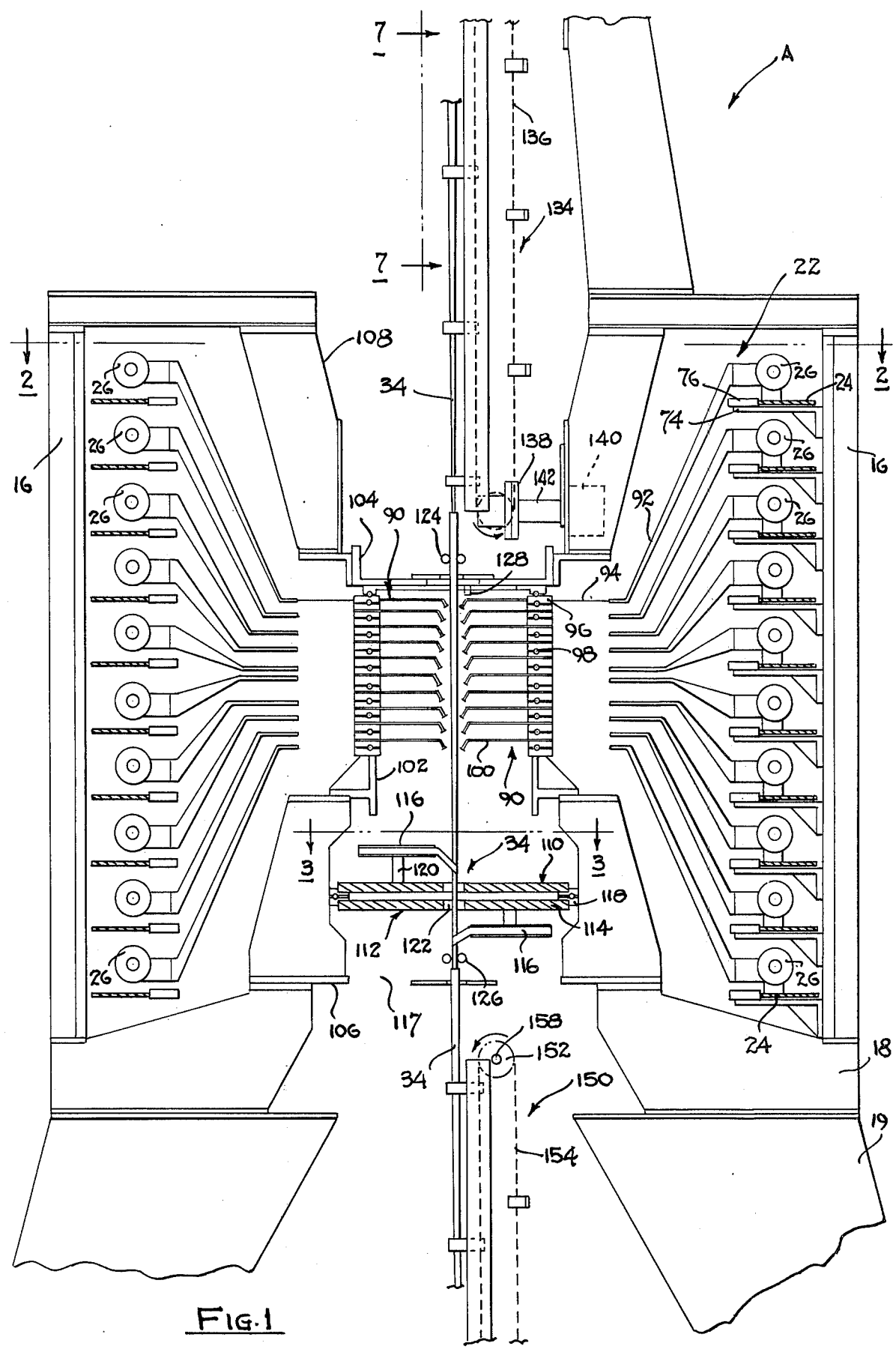
Figure 2:
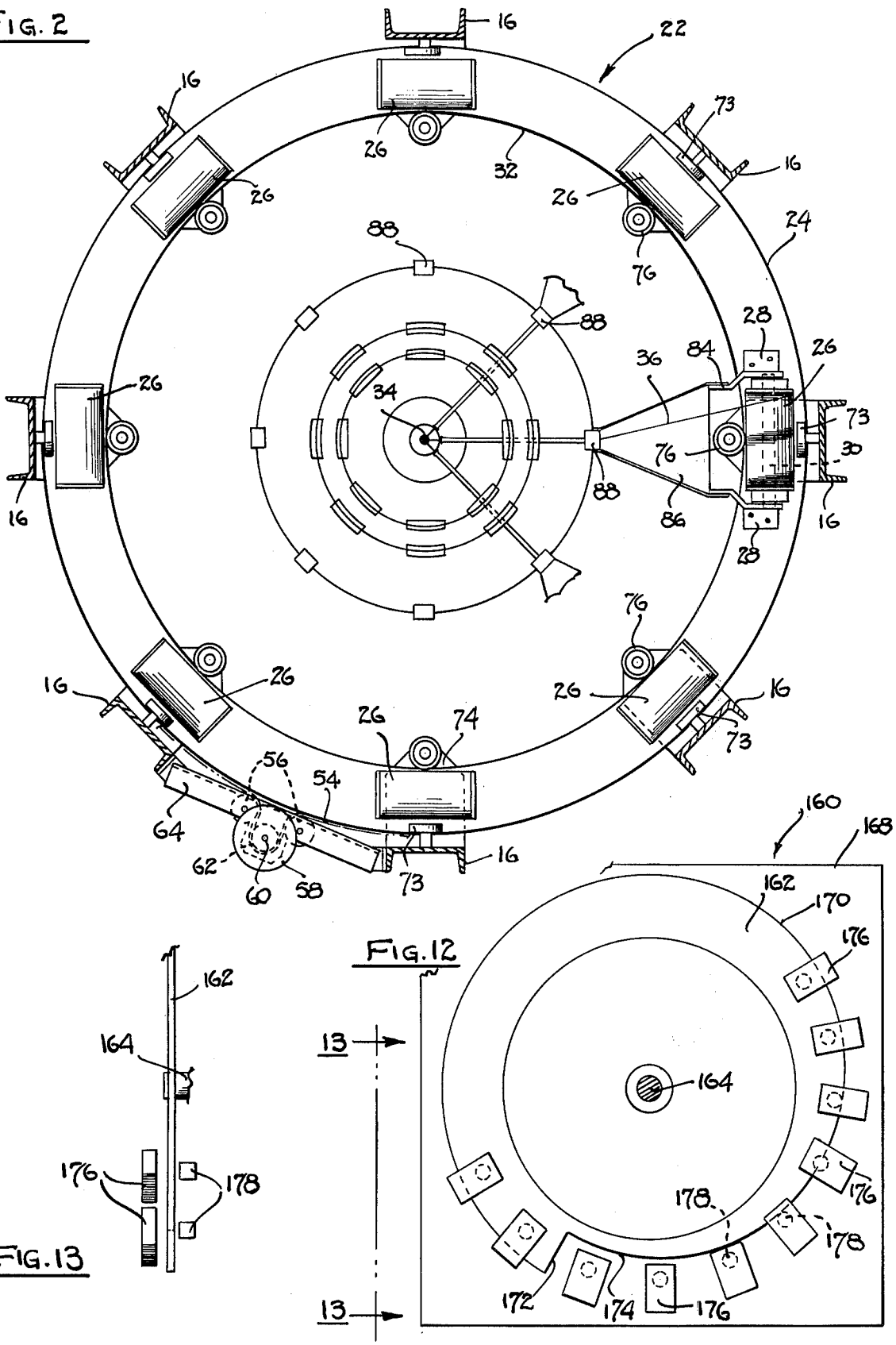
Figure 3:
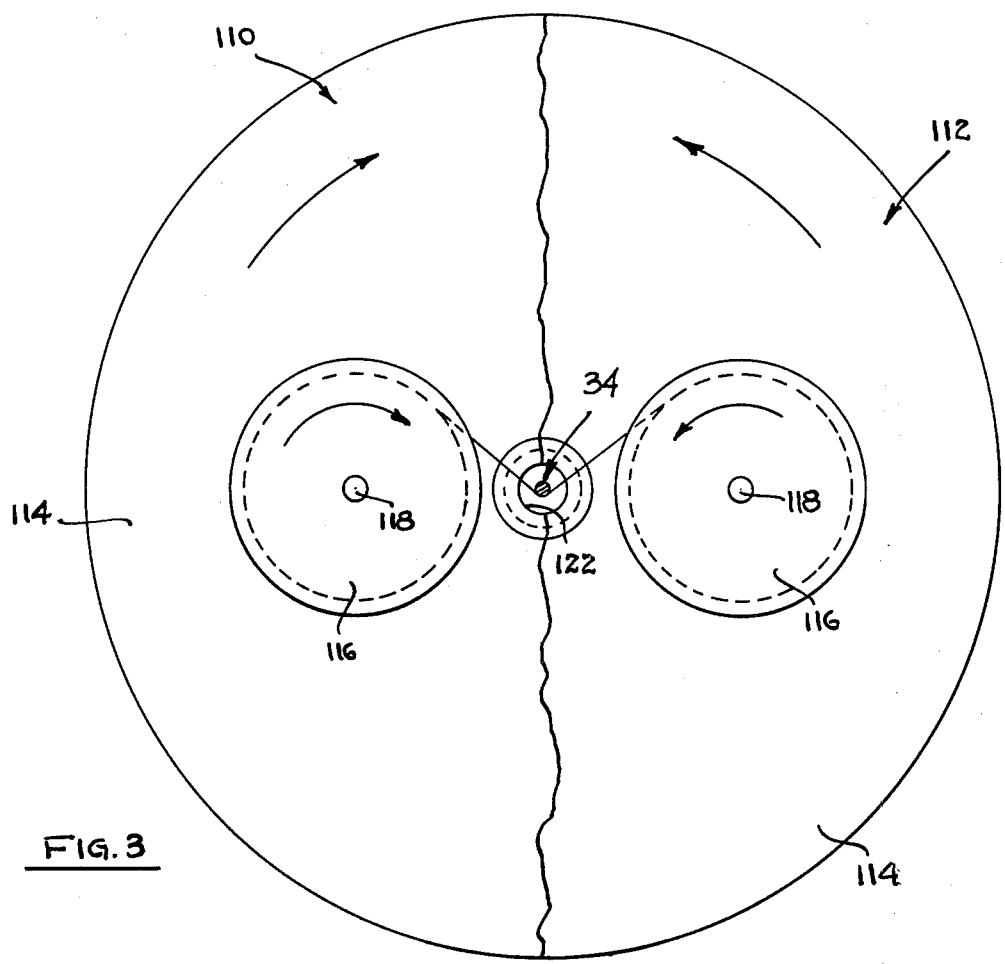
Figure 5:
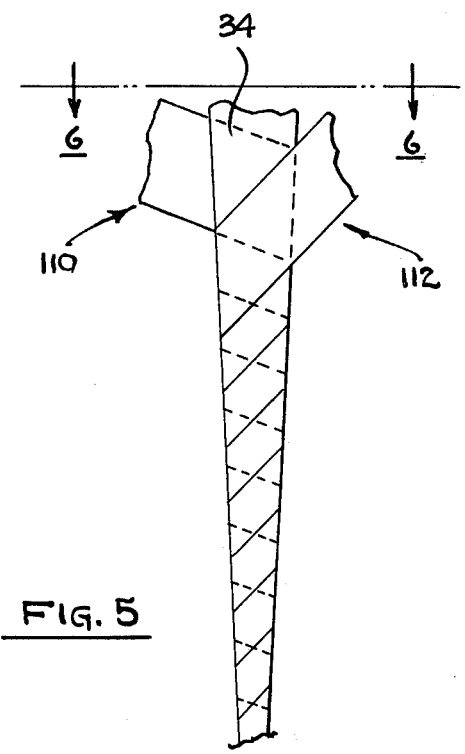
Figure 6:
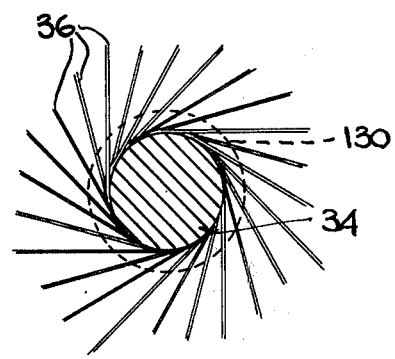
Figure 4:
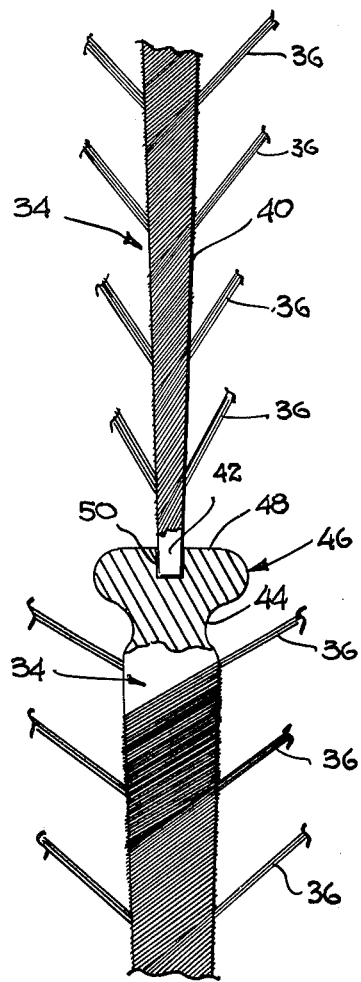
Figure 9:
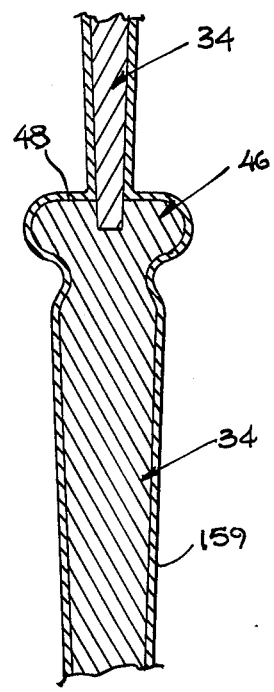
Figure 7:
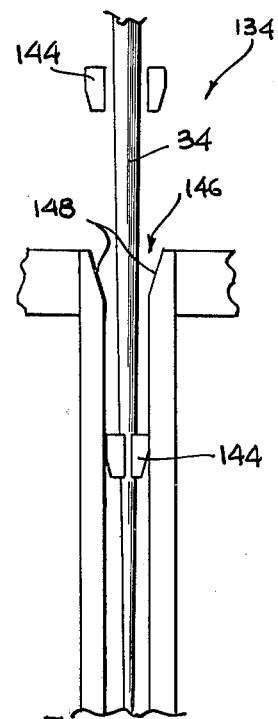
Figure 8:
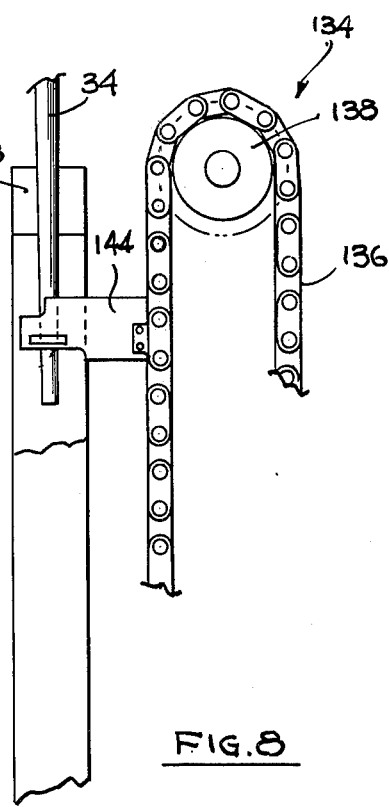
Figure 10:
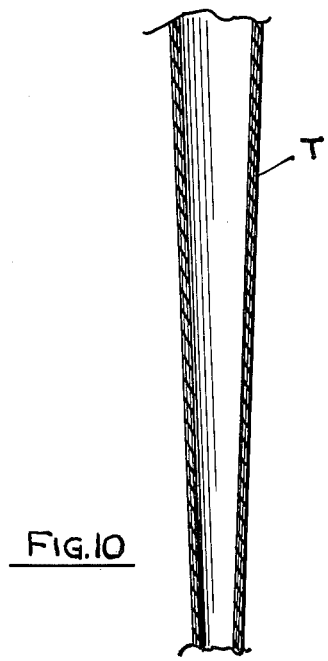
Figure 11:
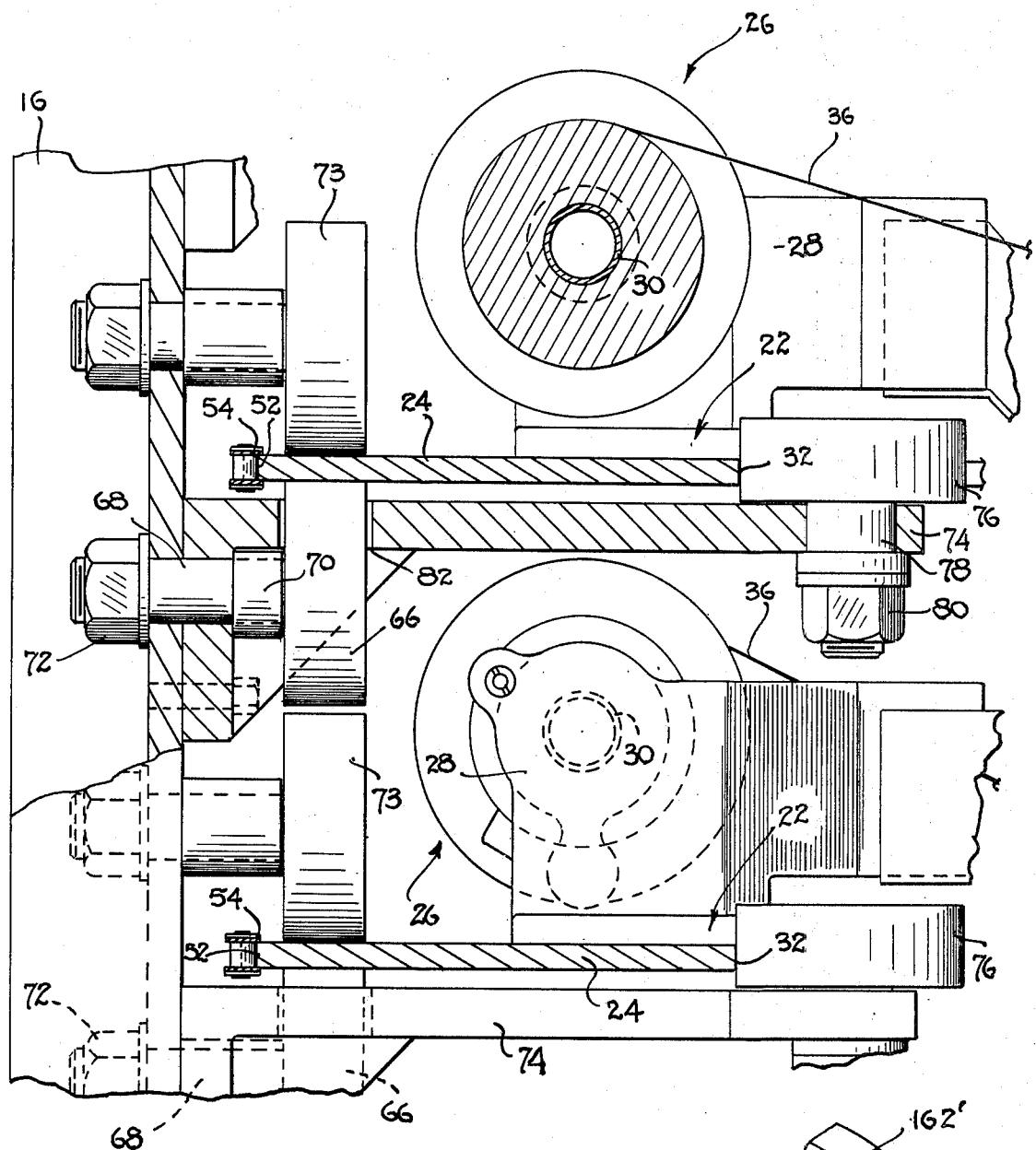
Figure 14:
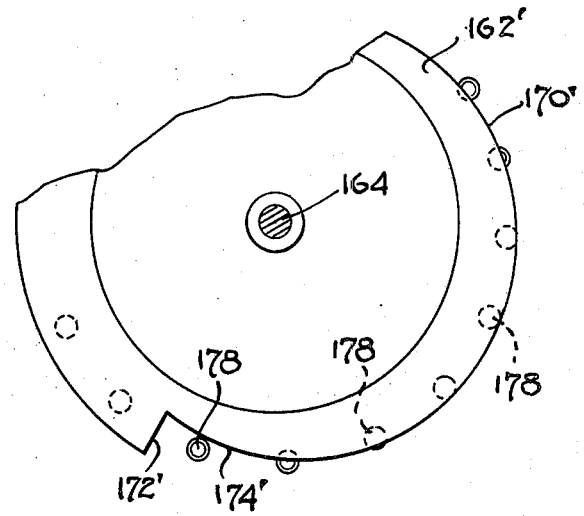
Figure 15:
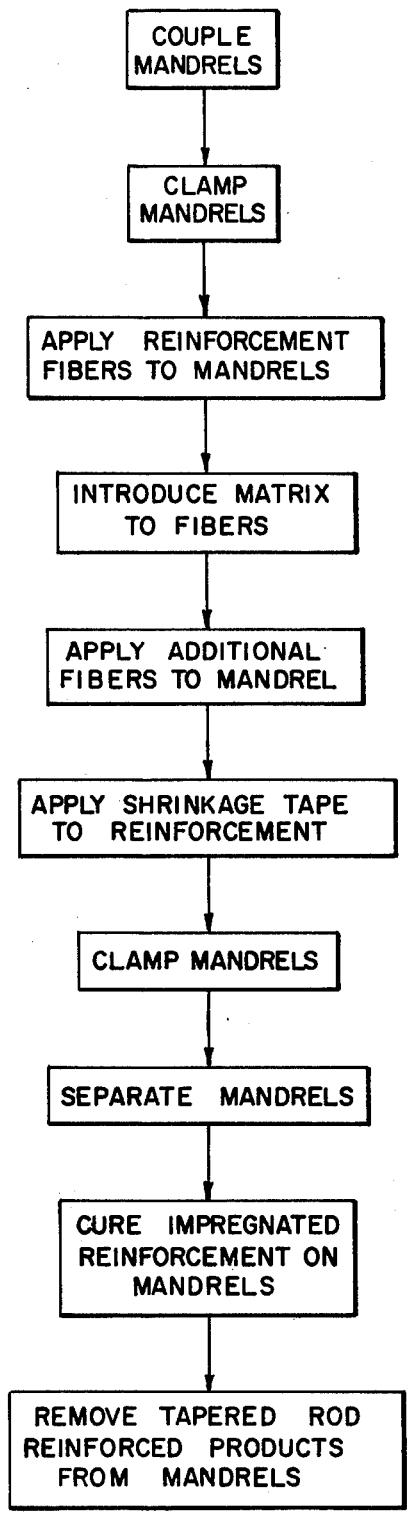

Having thus described the invention in general terms, reference will now be made to the accompanying drawings in which:

FIG. 1 is a schematic side elevational view, showing the major components of the apparatus of the present invention;

FIG. 2 is a horizontal sectional view taken along line 2—2 of FIG. 1 and showing one of the winding wheels of the present invention, capable of applying fiber reinforcement material to the continuously moving mandrels;

FIG. 3 is a horizontal sectional view taken along line 3—3 of FIG. 1 and showing the application of a shrink tape to the reinforcement material on the mandrels passing through the apparatus;

FIG. 4 is a schematic side elevational view showing the application to the upper reinforcement strands to the mandrels at varying angles during their passage through the various stages of winding in the apparatus;

FIG. 5 is a front plan view showing the application of reinforcement strands to one of the mandrels in the desired configuration;

FIG. 6 is a horizontal sectional view taken along the line 6—6 of FIG. 5;

FIG. 7 is a fragmentary side elevational view showing the upper clamping mechanism part of the apparatus of FIG. 1;

FIG. 8 is a fragmentary side elevational view, similar to FIG. 7, and showing the opposite side of the clamping mechanism for engaging the mandrels;

FIG. 9 is a vertical sectional view showing the application of the resin-impregnated reinforcing material to a series of successively engaged mandrels in accordance with the present invention;

FIG. 10 is a vertical sectional view showing one form of reinforced plastic tubular member produced in accordance with the present invention;

FIG. 11 is a vertical sectional view, showing one portion of a winding stage section in the apparatus of FIG. 1;

FIG. 12 is a side elevational view, showing a portion of a cam with sensory mechanisms for altering the winding pattern in accordance with the present invention;

FIG. 13 is an end elevational view of the cam with sensory mechanisms of FIG. 12, taken along the plane of line 13—13 of FIG. 12;

FIG. 14 is a side elevational view, similar to FIG. 12, and showing the technique of altering the winding pattern by selective employment of a different cam; and FIG. 15 is a schematic side elevational view, showing the steps employed in connection with the present invention in order to produce reinforced plastic tubular members of the present invention.

DETAILED DESCRIPTION

Referring now in more detail and by reference characters to the drawings which illustrate a preferred embodiment of the present invention. A designates a filament winding apparatus capable of producing tapered reinforced plastic products and which is more fully illustrated in schematic form. In this case, the reinforced plastic tubular products are those products which include a continuously tapered side wall from an upper end to a lower end thereof, and which are capable of being used in a wide variety of applications. For example, the reinforced tubular plastic products produced in accordance with the present invention may be used in the formation of golf clubs, fishing rods, ski poles and the like. In other commercial applications, reinforced plastic members which are tapered in their length can be used as flag poles, telephone poles and in various other forms of commercial and industrial applications. Generally, any form of tubular member which previously has been formed of metal or similar materials may be made of reinforced plastic materials in accordance with the present invention.

Referring again to FIG. 1, it can be observed that the apparatus of the present invention includes a plurality of upstanding support beams 16 which are arranged in somewhat of a circular pattern on a mounting frame 18 which is retained by a base frame 19. The support beams 16 are designed to retain a plurality of vertically spaced apart, successively located winding stages 22 as hereinafter described in more detail. The support beams 16 may be retained in any suitable housing and secured to the base frame or similar structure for their upright support by any conventional means. Generally, the entire apparatus A is enclosed in a housing, but which is not shown herein in order to more fully illustrate and describe the present invention.

Each of the successive winding stages 22 are each comprised of a generally circular disc 24 (or so-called "winding wheel") which carries on its upper surface a plurality of filament reinforcing material spools 26. These spools 26 are carried on the disc 24 by means of upstanding brackets 28. Central pintles 30 extend outwardly from the respective spools 26 and are mounted in the upstanding brackets 28 on the discs 24. The brackets 28 are of conventional construction and designed to permit easy insertion and removal of new spools. In this case, eight such spools 26 are shown on each plate 24, although the number of spools which would be utilized would vary in accordance with the desired reinforcement thickness and geometry desired in the final end product.

Any continuous filament capable of being bent to conform to the cylindrical surface of a geometrically cylindrical body of revolution can be employed in the present invention. The most preferred filaments employed are that of glass, carbon and boron. However, it should be recognized that other filaments formed of asbestos, aluminum, lithium, etc., can be effectively used. In addition, any grown-whisker crystals may also be employed. Metal wire may also be interspersed with the various filaments in the event that it is desired to add some type of metallic body to the reinforced material, which is produced, such as for example, to obtain electrical conductivity.

Generally, the filament reinforcing material which is issued from the various spools 26, which constitutes supply sources thereof, is applied to the mandrel in the form of strands. In accordance with established definitions in the reinforced plastics industry, a strand is comprised of one or more rovings arranged essentially in parallel disposition to form a thin flat band. The rovings generally contain a plurality of ends which, in turn, are a group of filaments gathered in the form of a strand and where the filaments are essentially placed in parallel disposition and form a substantially flat band. However, the term "strand" has often been used in a much more generic sense in order to encompass the definition of a roving, an end, or merely a group of filaments. Therefore, as used herein, the term "strand" will have this broader definition such that it will encompass any group of continuous filaments. In like manner, the term "reinforcing material" will also be representative of any group of filaments, no matter how arranged and whether or not in the form of rovings, ends, or strands, tapes, or the like.

Each of the discs 24 include an enlarged central aperture 32 in order to accommodate successively aligned and endwise connected mandrels 34 as illustrated in FIGS. 1 and 2 and also as described in more detail hereinafter. The individual stands, designated as 36, from the reinforcing material spools 26 are introduced through the central aperture 32 of the disc 24 for application to the mandrels 34 by means of a strand feed apparatus more fully described hereinafter. It can be observed that the mandrels are shiftable in an essentially vertical direction and the strands 36 are wound upon the mandrels as they move successively relative to the rotation of the discs 24. In this way, the various strands are wound upon the mandrels as illustrated in FIG. 4 of the drawings. For this purpose, the spools 26 are generally maintained under tension, so that the strands 36 are effectively pulled from the spools and applied to the mandrels 34 under tension. The amount of tension maintained in the spools 26 can be adjusted in order to obtain the desired degree of tension in the strands as they are wound upon the mandrels.

Referring now to FIGS. 1 and 4, it can be observed that each of the mandrels 34 are comprised of an elongate shank 40 which is essentially tapered throughout its length and is provided with a diametrally reduced lower end, or so-called "nose," 42. The upper portion of the shank 40 merges through a diametrally reduced annular groove section 44 into an enlarged head 46 having a flat upper surface 48. The head 46 is provided with a flat surface 48 with a recess 50 therein which is preferably conically shaped in order to conform to the angle of taper of the shank 40 and in order to accommodate the nose 42 of the next upper aligned mandrel 34. In this way, it can be observed that the mandrels may be connected in an endwise alignment for passage through the successive winding stages 22 in the manner illustrated in FIG. 1.

As illustrated herein, the angle of taper of the exterior wall of the shank 40 is relatively constant. However, the present invention is by no means limited to mandrels of a constant angle tapered shape and the angle of taper could vary throughout the length of the mandrel. The present invention, in this respect, is provided with the means to adjust the application rate and angle of application of reinforcing material in order to accommodate the differing angles of taper.

The mandrels 34 are preferably formed of a stainless steel material, although any structural metal may be employed in the formation of the mandrels. In like manner, the mandrels could be formed of other materials such as Teflon, or the like. It is important that the mandrel is capable of receiving the reinforcing material under tension and accommodating the various plys of reinforcing material under compressive loading. In addition, the mandrels should be so designed so that they can withstand curing temperatures, used in curing the resin matrix impregnated in the reinforcing material. Finally, the mandrels should also be designed so that the finally cured product can be removed from the mandrels by sliding the same off the tapered ends of the mandrels. For this purpose, a suitable lubricating composition could be applied to the surface of the mandrels. However, this lubricating composition should be applied very sparsely so that it does not interfere with the placement of the strand material on the mandrels.

The means for supporting and driving the winding wheels 24 of each of the successive winding stages 22 is more fully illustrated in FIGS. 1, 2 and 11 of the drawings. The various discs 24 are each provided with a gear ring 52 on their outer annular surface and which gear ring 52 is engaged by a continuous drive chain 54. The drive chain 54 is driven through a pair of sprockets 56 which are, in turn, driven by an electric motor 58 having a drive shaft 60 with a drive gear 62 located on the lower end of the drive shaft 60 in mating engagement with the pinion gears 56. The motor 58 is supported on a horizontally disposed plate 64 which extends between a pair of upstanding support posts 16, in the manner as illustrated in FIG. 2.

The drive motors 58 for each stage are individually controlled in a manner to be hereinafter described in more detail. In this way, when the motors 58 are energized, the pinion gears 56 will engage the gear rings 54 and cause rotation thereof, thereby causing the discs 24 to rotate.

The discs 24 are each supported by a plurality of circumferentially located rollers 66 which are retained on roller shafts 68 through bearings 70. The outer ends of the shafts 68 are threaded and retained by nuts 72 on the upstanding support posts 16, as illustrated in FIG. 11 of the drawings. It can be observed that each of the rollers 66 will thereupon engage the undersurface of each of the discs 24 and near their outer periphery thereof and thereby support the discs 24 during their rotating movement. Again, each of the rollers 66 supporting each disc would be angulated with respect to each other so as to form a continuous circumferential roller path. Hold-down rollers 73 are also secured to the posts 16, by similar construction, and are designed to engage the upper surfaces of the discs 24 as shown in FIGS. 2 and 11 of the drawings.

L-shaped brackets 74 are also secured to the upstanding supports posts 16, and each individual disc 24 has a bracket 74 located immediately therebeneath. At its outer end, the bracket 74 carries a plurality of circumferentially spaced horizontally disposed guide rollers 76 for engaging the rim of the disc 24 forming the central aperture 32. These guide rollers 76 are designed to retain the disc 24 in its horizontal positional relationship with respect to each of the successive discs 24 and with respect to the upstanding support posts 16. The guide rollers 76 are similarly retained on roller shafts 78 and secured to the underside of the bracket 74 by means of an enlarged nut 80. In addition, by further reference to FIG. 11, it can be observed that the brackets 74 are each provided with a plurality of slots 82 in order to accommodate the various support rollers 66 which in turn engage the underside of the disc 24. It can also be observed that each of the discs 24 of each of the successive winding stages 22 are also supported in a similar construction and in like manner.

Referring again to FIGS. 2 and 11, it can be observed that each of the brackets 28 are provided with outwardly struck arms 84 which are integral with the brackets 28. In this case, the brackets 28 would generally be formed as a single casting. Secured to the outwardly struck arms 84 is a feed tray 86 which is designed to carry the individual filament strand, as described in more detail hereinafter. It can be observed that the feed tray 86 is tapered inwardly in order to accommodate the angle of pay-out from the spool 26 as the filament strand 36 is effectively traversed across the spool 26 during pay-out thereof. The tray 86 terminates in a feeding eyelet 88 which receives and guides the strand 36 to the mandrel 34.

Referring again to FIGS. 1 and 2, it can be observed that each of the winding stages 22 also include a strand application section 90. Thus, an individual strand application section 90 is provided for each winding stage 22. Each of the strand application sections are comprised of feed tubes 92 which extend from the feeding eyelets 88. These feed tubes have plates 94 which connect the ends of the feeding tubes 92 to cylindrically shaped bearing blocks 96. The bearing blocks 96 for each of the successive strand application stages are successively stacked in the manner of FIG. 1, and are supported with respect to each other by means of bearings 98. In addition, the strand 36 which passes through the feed tubes 92 will pass over the plates 94 and through the bearing blocks 96 where they are thereupon introduced into final feed tubes 100, the latter terminating in close proximity to the mandrels 34.

The various bearing blocks 96 associated with each of the winding stages 22 are thereupon rotatable with the disc 24 of each such winding stage 22. Accordingly, it can also be observed that the feed tubes 92, along with the plates 94, will rotate these bearing blocks with the discs 24 as they so rotate. In addition, the final feed tubes 100 will also rotate with the associated winding stage 22.

By further reference to FIGS. 1 and 2, it can be observed that each of the bearing blocks 96 are supported by a lower bracket 102 and an upper bracket 104. The lower bracket 102 is in turn secured to a cylindrically shaped upstanding support housing 106, in the manner as illustrated in FIG. 1. The upper bracket 104 is similarly secured to additional support structure designed as 108 which is, in turn, carried by the upstanding support posts 16. This additional support structure is essentially conventional in construction and is, therefore, neither described nor illustrated in any further detail herein.

As indicated above, the strand application sections 90 form part of the individual winding stages 22, and are rotatable therewith. Therefore, when it is indicated herein that the winding stage 22 is rotating, it will be understood that the individual strand application section 90 associated therewith will also be rotating and in the same direction therewith and forms part thereof.

By further reference to FIG. 1, it can be observed that each of the strand application sections 90 are located in very closely spaced relationship to each other, relative to the spacing between each of the individual discs 24 forming part of the winding stages 22. In accordance with this construction, it can be observed that the strands from each of the successive winding stages are applied to the mandrels as they pass through the winding stages in very closely spaced relationship to each other. In this way, it is possible to obtain greater control over the application of the strand material to the mandrels in order to obtain the proper geometry and tension control on the strands.

Each of the individual winding stations 22 are controlled by means of the individual electric motors 58 associated therewith. Moreover, as indicated above, the rate of rotation of the winding stages 22 relative to the mandrels 34 can be varied in order to vary the application of the reinforcement material, ply by ply. In this way, it is possible to obtain the desired longitudinal stiffness or the desired tortional stiffness or a desired combination thereof, which is specified for the final tubular product. In addition, by controlling the rate of rotation of the various winding discs 24, it is possible to control the amount of strand material which is applied to the mandrels, and also to adjust the various angles of application of the strands to the various indexed mandrels. In this way, the individual motors enable the winding discs 24 to be individually programmable, so as to effectively "program" the geometry of the reinforcement as applied to the mandrels.

Each of the electric motors 58 are successively rotated in opposite directions so that the successive winding discs 24 are rotated in opposite directions. Thus, the uppermost disc 24 may be rotated, for example, in a clockwise direction, and the next disc spaced immediately beneath would be rotated in a counterclockwise direction, with the disc immediately below also rotated in a clockwise direction. In this way, the strands from each of the successive winding stations 22 are cross-wound upon the mandrels 34. In addition, inasmuch as the mandrels are moving past the various winding stations, the strands of reinforcing material will be applied in a helical pattern on the mandrels. However, by increasing the rate of rotation of the winding stations 22 relative to the movement of the mandrels, or otherwise decreasing the rate of movement of the mandrels relative to the winding stations, it is possible to apply circumferential plies of reinforcing material. Again, the rate of rotation of the winding wheels respecting the movement of the mandrels and also the rate of movement of the mandrels can be varied in accordance with the present invention in order to obtain the desired ply geometry.

The present invention does not illustrate the application of longitudinal strands to the mandrels as they pass the successive winding stations. However, it can be observed that longitudinal plies could be applied to the mandrels by holding the winding stage 22 in a stationary position. In this way, the unrotated winding stage will merely issue the reinforcing strand material to the mandrel as it passes, thereby causing the plies to be longitudinally disposed upon the surface of the mandrels. Again, while longitudinal stiffness can be obtained through the desired helical wrap, it may also be desirable to obtain greater longitudinal stiffness and, as indicated, this additional longitudinal stiffness would be accomplished by merely holding one of the winding stations in a stationary position. Generally, when applying longitudinal strands, the uppermost winding stations should be held in the stationary position, although it is not necessary, and any such winding stage could be held in the stationary position in order to provide the proper longitudinal strand application.

The number of winding stages as illustrated in the present invention is only exemplary and any number of winding stages may be employed. Again, the number of winding stages which would be employed would be dependent upon the desired thickness of the reinforced material on the mandrels.

FIG. 4 illustrates the arrangement of various plies of reinforcing material being wound upon successively indexed mandrels. In this case, it can be observed that six individual plies from successive winding stations are wound upon the lower end of one mandrel at decreasing angles relative to the axis of the mandrel and two additional subsequent plies from additional succeeding winding stations are wound upon the upper end of a next lower mandrel at different angles, e.g. at greater angles than the first six plies. In order to obtain uniform wrap geometry and thickness, due to the decreasing diameter of the mandrel successively along its length, the angle of wrap, relative to the axis of the mandrel, must become progressively smaller. However, as indicated above, any form of geometry and angle of wrap could be programmed in accordance with the present invention.

Located beneath each of the winding stations 22 which apply the reinforcing material, and in the direction of movement of the mandrels 34, are a pair of tape winding stations 110 and 112. The tape winding stations 110 and 112 are similar in construction and each comprises a disc 114 having a spool of tape 116 disposed on one flat surface thereof. The discs 114 are held within a central cavity 117 formed in the cylindrical housing 106. Moreover, the discs 114 are conventionally rotatably supported through bearing blocks 118 extending from the housing 106, as illustrated in FIG. 1.

The spools 116 are mounted so that they are horizontally disposed and include spool shafts 120 secured to the discs 114. It can be observed that these two discs 114 of the tape winding stations 110 and 112 are also supported rotatably, but in vertically fixed relationship with respect to the upstanding support posts 16, as illustrated in FIG. 1 of the drawings. Each of the discs 114 are provided with central apertures 122 to accommodate the various indexed mandrels and to permit the tapes to be applied to the mandrels through the apertures 122.

The two tape winding stations 110 and 112 are also rotated in opposite directions relative to each other and to the movement of the mandrels 34. In this way, the tape from each of these spools 116 is applied to the reinforcement on the mandrel in a cross-wound direction. Again, the amount of tape which is applied and the angle of the tape can also be varied as desired in order to provide the proper tape geometry.

The tapes which are dispensed at the tape winding stations 110 and 112 are preferably a shrink tape such that the tape would shrink around the reinforcing material when cured. In the preferred aspect, the shrink tape employed is that of cellophane. However, other forms of shrink tapes, such as a fluorocarbon tape, offered by DuPont Chemical Corporation, under the name "Tedlar," may also be used. In this respect, Teflon, polyethylene and various vinylidene chlorides could also be used as the film material. In essence, any film material with some degree of shrinkage and which is capable of withstanding curing temperatures and which is also capable of being wound upon and sticking to the reinforcement material under tension may be used in the present invention.

Upper and lower sets of guide rollers 124 and 126 are also located in the path of the mandrels 34 in order to guide the mandrels during their vertically shiftable movement. These guide rollers 124 and 126 can be secured to the supporting structure in any conventional manner.

A curable resin matrix is introduced through a resin feed tube 128 and which is in this case located at the first or uppermost strand feed section of the first winding stage. However, the resin could be introduced at essentially any point during the winding process as the mandrels pass through the winding stages, although it is preferable to introduce the resin matrix at an early winding stage, preferably the first one. In this case, the resin feed tube 128 would be connected to a source of resin, as for example, a container thereof which is introduced into the feed tube 128 by means of a pump or similar means for forcing the resin through the tube 128.

Any material which is capable at some stage of the process of being liquified and softened for a period of time may be employed as the resin binder or so-called "matrix" and, furthermore, the matrix should be of sufficiencity low viscosity so as to flow between adjacent filaments and layers thereof before achieving a rigid state through cooling or completing polymerization to become a rigid solid. The matrix should also possess the ability to adhere to the reinforcement material. Some examples of a suitable binder or matrix which can be used in the present invention are various thermoplastic resins, such as nylon, polyethylene, polypropylene and many of the polycarbonates, polyesters, etc. In addition, thermo-setting resins, such as phenolics and epoxy, etc., can be used. The thermo-setting resins should be capable of being fused into an insoluble non-softening mass upon application of heat or similar method of triggering the catalytic system. Other binders which may be used are hard waxes, eutectic ceramics, eutectic metals, synthetic rubbers, etc.

Generally, the resin should be in a liquid state at the point of application to the reinforcing material. By reference to FIGS. 5 and 6 of the drawings, it can be observed that when the strand material is wound upon the mandrel, the various strands form a conically shaped section 130 of reinforcing material. In essence, this conically shaped section is created by the strands being applied in a sufficient compactness so that they effectively present a solid conically shaped wall, with respect to the liquid resin matrix. In this case, the liquid resin matrix, when introduced into the conically shaped section, will effectively fill this conically shaped section. Beyond the conically shaped section, it can be observed that the strands form a section of less compactness creating voids or spaces therebetween, and the liquid resin will flow through the voids or spaces.

The liquid resin is preferably introduced at the upper stage so that it will literally overflow the conically shaped section 134 and travel downwardly along the various mandrels with reinforcing material thereon until the next succeeding conically shaped section formed by the reinforcing material from the next succeeding winding station. In the preferred aspect of the invention, the amount of resin matrix material which is introduced is sufficient so that the resin will overflow each conically shaped area thus formed to the next succeeding conically shaped area and is sufficient to fill the lowermost conically shaped area formed by the reinforcement material from the last winding stage. In accordance with this technique, it can be observed that the resin is introduced at the point where the reinforcing strands are being wound upon the mandrel and is therefore capable of thoroughly impregnating the reinforcing material on a consistant basis. In addition, the resin flow through the feed pipe 128 is continued through the entire winding process but at an amount sufficient in order to have the resin overflow each of the various conically shaped areas and sufficient to flow into the last conically shaped area of reinforced material.

The indexed mandrels, that is the mandrels held in the endwise aligned relationship, are passed through the various vertically spaced apart winding stages by means of an upper feeding mechanism 134, more fully illustrated in FIGS. 1, 7 and 8 of the drawings. The mandrel feeding mechanism 134, which functions as and is often referred to as a "clamping mechanism" or "mandrel drive means," comprises a continuous drive chain 136 trained around a pair of sprockets 138. One of the sprockets 138, namely the lower one thereof, is rotated by means of a conventional electric motor 140 having a drive shaft 142 connected to the sprocket 138. Again, this electric motor 140 is preferably a 110-volt AC electrical motor and is individually operated with respect to any of the other electric motors as heretofore described. The upper feeding mechanism 134 is individually operated so that it may be controlled for regulating the rate of feeding the various mandrels 34 independently of the rate of rotation of the various winding stages.

The feeding mechanism 134, as illustrated in FIGS. 7 and 8 of the drawings, also comprises a plurality of spaced apart clamping fingers 144 which are secured to one of the links of the drive chain 136. The clamping fingers 144 which operate in pairs so as to function as a so-called "jaw" are initially biased to their open position by means of a compression spring mechanism (not shown). However, as the mandrel 34 is passed toward the winding stations, the mandrel, along with the clamping fingers 144, are introduced into a camming section 146 having a pair of inwardly converging camming walls 148, in a manner as more fully illustrated in FIG. 7. It can be observed that the camming walls 148 essentially have a configuration and angle of taper essentially equivalent to the angle of taper of the tapered mandrel 34, although it is not necessary to provide a tapered camming wall 148 with the same such angle of taper. As the mandrel 34 passes through the camming section 146, the camming walls 148 will bias the clamping fingers 144 to the closed position, as illustrated in FIG. 7, where they effectively engage the outer surface of the mandrel. Moreover, by reference to FIG. 1, it can be observed that one mandrel 34 is indexed into the next lowermost successive mandrel 34 and each of the next mandrels are engaged by the clamping fingers 144. As the mandrels pass out of the upper feeding mechanism 134, they are introduced into the various winding stations as heretofore described.

A lower feeding mechanism 150, or so-called "clamping mechanism," is also employed in accordance with the present invention, and the lower feeding mechanism 150 is similar in construction and operation to the upper feeding mechanism 134. Thus, the lower feeding mechanism 150 includes a pair of vertically spaced apart pulleys 152, with a continuous drive chain 154 trained therearound. Again, one of the pulleys 152 is operated by means of an electric motor (not shown) through a motor shaft 158. In this way, the lower feeding mechanism 150 can be operated independently of any of the upper feeding mechanism 134 or any of the individual winding stations. However, in a preferred aspect of the invention, the lower feeding mechanism 150 would be operated at the same rate of speed as the upper feeding mechanism 134. The remaining construction and operation of the lower feeding mechanism 150 is substantially identical to the upper feeding mechanism 134, and is therefore not described in any further detail herein.

It can be observed that when the two feeding mechanisms 134 and 150 operate in coincident timed relationship, the various mandrels 34 will all be retained in their passage through the various winding stations in their vertically aligned and indexed relationship. Thus, for example, the lowermost mandrels 34 as illustrated in FIG. 1 are retained in fixed relationship with respect to the rotation of the continuous belt 154. In like manner, the uppermost mandrels 34 are also moved into the winding stations at the rate of rotation of the continuous belt 136. In this way, all of the mandrels therebetween will be held in the axially aligned and indexed relationship. After the mandrels pass through the lower feeding mechanism 150, they are separated for curing and removal of the reinforcing material, as hereinafter described.

FIG. 9 illustrates the reinforcing material as applied to the successive aligned and indexed mandrels 34 and which has been matrix impregnated. Thus, FIG. 9 essentially shows the thickness of the reinforcing material which extends as a continuous outer covering 159 on a plurality of successively aligned mandrels 34 as they are introduced into the lower feeding mechanism 150. Thereafter, the reinforcing material around the nose end of each of the successive mandrels can be cut in order to separate the individual mandrels. The matrix impregnated reinforcing material disposed on the mandrels is then cured in a suitable oven or similar curing means in order to produce a tapered reinforced plastic tubular product. After the impregnated reinforcing material has been fully cured, a reinforced plastic tubular product T may be removed from the mandrel as illustrated in FIG. 10 of the drawings.

FIGS. 12 and 13 more fully illustrate the programming device 160 which is capable of programming the various winding stages, as previously described. The programming device 160 comprises a cam-shaped plate, or so-called "cam plate" 162, mounted on a shaft 164 driven by an AC electric motor 166. The programming device 160 may be retained in a suitable housing 168 in association with the main housing of the apparatus A. The cam plate 162 is somewhat eccentrically shaped and includes an outer peripheral side wall 170 having a drop-off shoulder 172, which merges into a camming shoulder 174, and which, in turn, merges into the outer peripheral side wall 170. The cam plate 162, and particularly the peripheral side wall 170, along with the drop-off shoulder 172, and the camming shoulder 174, essentially represent the convoluted outline of a tapered mandrel if the same were opened and laid in a flat-wise condition. In this way, when the cam plate 162 rotates, the peripheral wall 170 effectively represents the rate of rotation of the winding stations relative to the mandrels 34. In this respect, the drop-off shoulder 172 and the camming shoulder 174 could be adjusted to have different angulated positions as illustrated in FIG. 14. Thus, FIG. 14 represents an alternative cam plate 162' having a different elliptically shaped side wall 170' and a different drop-off shoulder 172' and camming shoulder 174'.

A plurality of photocells 176 are located on one side of the cam plate 162 and in relationship to the peripheral wall 170, in the manner as illustrated in FIGS. 12 and 13. The photocells 176, often referred to as "receptors," operate in conjunction with aligned light sources 178 on the opposite side of the cam plate 162 and in relationship to the peripheral wall 170 so that each one of the photocells 176 is aligned with each one of the light sources 178.

The photocells 176, in combination with the light sources 178, effectively sense the length of the mandrel relative to the rate of rotation of the cam plate 162 and in so doing, sense the effective change of the elliptically shaped peripheral wall 170 equivalent to the angle of taper on that portion of the mandrel.

By further reference to FIG. 12, it can be observed that the photocells are located so that they are successively either covered or uncovered during rotation of the cam plate 162. In this respect, a particular photocell is employed for each winding station thus employed in the apparatus. Thus, with ten winding stations, for example, ten photocells and the associated light sources are employed. However, it can be observed that as the disc 162 rotates, several of the photocells in the right-hand portion of FIG. 12 are covered by the camming plate 162. Continued rotation thereof causes several of the photocells to be at least partially uncovered and then fully uncovered by the camming plate so that they are exposed to the associated light sources. Again, when the drop-off shoulder passes several of the light sources, they are almost immediately exposed. This constant rotation of the cam plate 162, relative to the photocells, generates signals which are effectively related to the angle of taper of the mandrel.

It can be observed that if the rate of rotation of the cam plate 162 is increased, the angle of application of the strand material to the mandrel will also increase. In essence, the cam plate allows the operator of the apparatus to set up any effective length of mandrel within certain limits and change the angle of taper of the strand application within certain limits. Moreover, and as indicated above, the angle of taper of the mandrel requires the successively applied strands to be wrapped around the mandrel at a constantly decreasing angle, relative to the central axis of the mandrel. The particular shape of the cam plate 162 allows for the successive rate of change.

The information which is sensed by the photocells may be introduced into a conventional ratio control programmer. This ratio control programmer will provide the proper signal level to the various individual drive motors 58 permitting the drive motors 58 to rotate the various winding stages 22 at the proper rate of rotation. It can be observed in this respect that by changing the camming disc, as for example, to that camming disc illustrated as 162' in FIG. 14, different rates of rotation of the various winding stages could also be obtained.

In addition, the photocells 176 and also the light sources 178 operating in conjunction therewith can be slidably adjustable on a suitable mounting means, as for example, the housing 168. By changing the spacing between the various photocells and the associated light sources, it is possible to change the effective representation of the length of the mandrels.

The operation of the apparatus and the various steps in the method of using the same have been fully set forth in connection with the foregoing description. However, in order to more fully appreciate and understand the steps in the operation of this apparatus and the method of using the apparatus, FIG. 14 sets forth certain of these steps in schematic form.

Initially, several of the mandrels 34 are coupled in endwise relationship as previously described. The mandrels are thereafter clamped, as in the upper feeding mechanism 134, and introduced into the various winding stages 22. Thereafter, the reinforcing material is applied to the mandrels in the desired wrap thickness with the desired wrap geometry. The resin matrix is then introduced into the fibers as through the resin feeding tube 128. During the application of the resin matrix material, additional reinforced material is applied to subsequent mandrels as they are successively located with respect to the successive winding stages. In the same respect, the resin matrix is continuously supplied to the uppermost conically shaped section 130 and allowed to travel down the reinforcing material on the mandrels as previously described.

After the reinforcing material has been resin-impregnated, and has been wound upon the mandrel, the mandrels are then passed through the two shrinkage tape winding stations where the shrinkage tape is crosswound upon the mandrels, and also in the desired geometry. The shrinkage tape, in this respect, is designed to fully wrap the entire outer surface of the reinforcement on the mandrel.

As the mandrels pass through the shrinkage tape winding stations, they then pass into the lower feeding mechanism 150, which again causes the clamping of the mandrels. The mandrels are then passed through the lower feeding mechanism 150, whereupon they are separated by merely cutting the reinforcing material around the upper and lower edges of the two endwise aligned mandrels. The mandrels are then introduced into a suitable curing station, where the resin matrix impregnated reinforcing material is fully cured. Thereafter, a tapered rod product T is removed from the mandrels. The shrink tape is wrapped about the reinforcing material and will shrink during the curing process to densify the impregnated reinforcing material during curing thereof. The mandrels are then returned for continuous use through the apparatus as originally described. In the same regard, it should be observed that a number of mandrel shapes and sizes may be employed in order to produce different types of reinforced plastic tubular products.

Thus, there has been illustrated and described a unique and novel apparatus and method of producing reinforced plastic tubular products, as well as the reinforced plastic tubular products which are tapered, and which therefore fulfills all of the objects and advantages sought therefor. It should be understood that many changes, modifications, variations and other uses and applications will become apparent to those skilled in the art after considering this specification and the accompanying drawings. Therefore, any and all such changes, modifications, variations and other uses and applications are deemed to be within the spirit and scope of the invention and covered thereby.

Having thus described my invention, what I desire to claim and secure by letters patent is:

1. An apparatus for producing a reinforced plastic tubular product having a tapered shape, said apparatus comprising:
   (a) frame means,
   (b) a plurality of successive winding stages operatively mounted on said frame means,
   (c) a plurality of sources of filament containing reinforcing material associated with each of said winding stages and capable of issuing strands of the reinforcing material therefrom, each of said sources being spaced apart from each other in at least a somewhat vertical direction,
   (d) means for moving a mandrel having a tapered shape equivalent to that of the product to be produced past said successive winding stages in at least a somewhat vertical direction and winding the issued strands of reinforcing material on said mandrel during movement thereof, said strands of reinforcing material being applied to the mandrel from the plurality of sources at each such winding stage forming a conically shaped section of reinforcing material directed rearwardly with respect to the movement of the mandrel, the density of the strands of reinforcing material decreasing in proportion to the distance radially outwardly from the mandrel, said strands forming a conically shaped section around said mandrel which is relatively dense and relatively resin matrix impervious but which becomes pervious to resin matrix through opened portions between the strands at distances radially outwardly therefrom,
   (e) means for applying a liquid resin matrix in relation to one of said successive winding stages into a conically shaped section as formed, said resin matrix being applied in an amount said that the resin matrix overflows said relatively dense portion of strands of reinforcing material through opened areas between the reinforcing material beyond said relatively dense portion so that the resin matrix may flow toward a conically shaped area formed by strands of reinforcement material from a next succeeding winding stage, and
   (f) means for causing relative rotation between said winding stages and said mandrel to enable winding of said reinforcement material on said mandrel during movement thereof,
whereby said reinforcing material may be matrix cured and removed from said mandrel to produce said tubular product.

2. The apparatus of claim 1 further characterized in that said resin matrix is applied in a sufficient amount so that the resin matrix will overflow each conically shaped area thus formed to the next succeeding conically shaped area formed by the reinforcing material from each of the successive winding stages.

3. The apparatus of claim 1 further characterized in that said successive winding stages each comprise a disc member with the source of filament containing reinforcing material carried thereby, and that the means for causing relative rotation comprises means for rotating said discs relative to said mandrel.

4. The apparatus of claim 3 further characterized in that said discs include means forming a central aperture through which said mandrel moves relative to the winding stages and the reinforcing material is introduced through the apertures for application to the mandrel.

5. The apparatus of claim 1 further characterized in that each of said successive winding stages rotates in an opposite direction with respect to the next succeeding winding stage to cause reinforcing material from successive stages to be wound on the mandrel in opposite directions.

6. An apparatus for producing a reinforced plastic tubular products having a tapered shape, said apparatus comprising:
(a) frame means,
(b) a plurality of successive winding stages operatively mounted on said frame means,
(c) a source of filament containing reinforcing material associated with each of said winding stages and capable of issuing the reinforcing material therefrom,
(d) means for moving a mandrel having a tapered shape equivalent to that of the product to be produced past said successive winding stages and winding the issued reinforcing material on said mandrel during movement thereof,
(e) means for causing relative rotation between said winding stages and said mandrel to enable winding of said reinforcement material on said mandrel during movement thereof,
(f) individual winding stage drive means operatively associated with certain of said successive winding stages,
(g) mandrel feeding drive means to enable feeding of said mandrel past said successive winding stages,
(h) disc means operatively rotating in effective relationship to said mandrel feeding drive means and in relationship to said winding stage drive means, said disc means having a shape effectively representation of the tapered shape of said mandrel if an outer surface of said mandrel were laid out in a flat position,
(i) and sensor means operatively associated with said disc means to adjust the rate of application of the reinforcing material to the movement of said mandrel to vary the angle of application of the reinforcing material to the mandrel,
whereby said reinforcing material may be matrix cured and removed from said mandrel to produce said tubular product.

7. The apparatus of claim 6 further characterized in that said sensor means comprises receptor elements operatively mounted with respect to the periphery of said disc means, and light means also operatively located with respect to the periphery of said disc means.

8. The apparatus of claim 6 further characterized in that said disc has a cam shape representing an unfolded shape of a tapered mandrel outer surface.

9. The apparatus of claim 6 further characterized in that each of said successive winding stages rotates in an opposite direction with respect to the next succeeding winding stage to cause reinforcing material from successive stages to be wound on the mandrel in opposite directions.

10. The apparatus of claim 6 further characterized in that a plurality of successively aligned endwise connected mandrels are passed through said winding stages, each of said mandrels having an enlarged end and an opposite diametrally reduced end, means forming a coupling in the enlarged end to receive the diametrally reduced end of the next successive mandrel, said aperture further comprising first mandrel feeding means for engaging and moving said endwise connected mandrels past said successive winding stages, and second mandrel feeding means for also engaging said endwise connected mandrels and moving said mandrels from said successive winding stages, said first and second mandrel feeding means being operable in combination to retain said endwise aligned mandrels in connected relationship during movement past said successive winding stages.

11. An apparatus for applying a filament containing reinforcing material to a mandrel having a tapered shape to produce a reinforced plastic tubular tapered product as said mandrel moves past a plurality of successive winding stages with relative rotation existing between the winding stages and the mandrel, the improvement comprising individual first drive means for driving each of said successive winding stages, second drive means for feeding said mandrel past said successive winding stages, disc means operatively rotating in effective relationship to said first drive means and rotating in effective relationship to movement of said second drive means, said disc means having a shape effectively representative of the shape of said mandrel if a representation of the outer surface of said mandrel were unfolded, and movable sensor means operatively associated with said disc means to adjust the rate of application of the reinforcing material to the movement of said mandrel to vary the angle of application of the reinforcing material to the mandrel.

12. The apparatus of claim 11 further characterized in that said disc has a cam shape equivalent to the unfolded shape of a tapered mandrel outer surface.

13. An apparatus for applying a filament containing reinforcing material to a mandrel having a tapered shape to produce a reinforced plastic tubular tapered product as said mandrel moves past a plurality of successive winding stages with relative rotation existing between the winding stages and the mandrel, the improvement comprising individual first drive means for driving each of said successive winding stages, second drive means for feeding said mandrel past said successive winding stages, disc means operatively rotating in effective relationship to said first drive means and rotating in effective relationship to movement of said second drive means, said disc means having a shape effectively representation of the shape of said mandrel, and first sensor means and second sensor means operatively associated with said disc means to adjust the rate of application of the reinforcing material to the movement of said mandrel to vary the angle of application of the reinforcing material to the mandrel, one of said first or second sensor means being movable, said first sensor means comprises receptor elements with respect to the periphery of said disc means, and said second sensor means comprises light means also operatively located with respect to the periphery of said disc means, and capable of being in alignment with said receptor elements.

14. The apparatus of claim 13 further characterized in that said receptor elements are movable.

15. An apparatus for producing reinforced plastic tubular products having a constantly tapered shape from at least one end across the substantial portion of its axial length, said apparatus comprising:
(a) frame means,
(b) a plurality of successive winding stages operatively mounted on said frame means, each said winding stage comprising a rotatable disc with each disc having a plurality of spools containing reinforcing material for issuing the reinforcing material therefrom, (c) means for moving a plurality of endwise connected, essentially vertically disposed mandrels, each of said mandrels having a constantly tapered shape equivalent to that of the product to be produced, said mandrels being moved past said successive winding stages for winding the issued reinforcing material on said mandrels during movement thereof, each of said mandrels having an enlarged end and an opposite diametrally reduced end and being constantly tapered from at least the reduced end across a substantial portion of its axial length, means forming a coupling in the enlarged end to receive the diametrally reduced end of the next successive mandrel, (d) individual means at each of said winding stages for causing rotation of said discs at said winding stages about said mandrels to enable winding of said reinforcement material on said mandrels during movement thereof, (e) control means operatively connected to each of said drive means to control the rotation of the discs at each of said successive winding stages to apply the reinforcement material to the mandrels at successively and proportionally increased angles relative to the axis of the mandrels from the reduced ends toward the enlarged ends across the constantly tapered portion thereof, (f) first mandrel feeding means for engaging and moving said endwise connected mandrels past said successive winding stages, and (g) second mandrel feeding means for also engaging said endwise connected mandrels and moving said mandrels from said successive winding stages, whereby said reinforcing material may be matrix cured and removed from each of said mandrels to produce said tubular products.

16. The apparatus of claim 15 further characterized in that said apparatus comprises means for applying a shrinkage tape to the reinforcing material on said mandrels.

17. The apparatus of claim 15 further characterized in that each of said successive winding stages rotates in an opposite direction with respect to the next succeeding winding stage to cause reinforcing material from successive stages to be wound on the mandrels in opposite directions.

18. The apparatus of claim 16 further characterized in that the means for applying the shrinkage tape comprises a first plate with a source of tape for applying a first layer of shrinkage tape to the reinforcement material on the mandrels, and a second plate successively located with respect to said first plate in the direction of movement of the mandrels and having a source of tape to the reinforcement material on the mandrels.

19. The apparatus of claim 15 further characterized in that said reinforcing material is applied to the mandrels from a plurality of sources thereof at each such winding stage forming a conically shaped section directed rearwardly with respect to the movement of the mandrels, said apparatus further comprising means for applying a liquid resin matrix in relation to one of said successive winding stations into a conically shaped section as formed, said resin matrix being applied in an amount that the resin matrix overflows a relatively dense portion of reinforcement material through opened areas between the reinforcement material beyond said dense portion so that the resin matrix may flow toward a conically shaped area formed by reinforcing material from a next succeeding winding stage.

20. An apparatus for producing a reinforced plastic tubular products having a tapered shape, said apparatus comprising:

a frame means, (b) a plurality of successive winding stages operatively mounted on said frame means, (c) a source of filament containing reinforcing material associated with each of said winding stages and capable of issuing the reinforcing material therefrom, (d) means for moving a mandrel having a tapered shape equivalent to that of the product to be produced past said successive winding stages and winding the issued reinforcing material on said mandrel during movement thereof, (e) means for causing relative rotation between said winding stages and said mandrel to enable winding of said reinforcement material on said mandrel during movement thereof, (f) individual winding stage drive means operatively associated with certain of said successive winding stages, (g) mandrel feeding drive means to enable feeding of said mandrel past said successive winding stages, (h) disc means operatively rotating in effective relationship to said mandrel feeding drive means and in relationship to said winding stage drive means, said disc means having a shape effectively representative of the shape of said mandrel, (i) and sensor means operatively associated with said disc means to adjust the rate of application of the reinforcing material to the movement of said mandrel to vary the angle of application of the reinforcing material to the mandrel, said sensor means comprising receptor elements operatively mounted with respect to the periphery of said disc means, and light means operatively located with respect to the periphery of said disc means, whereby said reinforcing material may be matrix cured and removed from said mandrel to produce said tubular product.

21. An apparatus for producing a reinforced plastic tubular products having a tapered shape, said apparatus comprising:

(a) frame means, (b) a plurality of successive winding stages operatively mounted on said frame means, (c) a source of filament containing reinforcing material associated with each of said winding stages and capable of issuing the reinforcing material therefrom, (d) means for moving a mandrel having a tapered shape equivalent to that of the product to be produced past said successive winding stages and winding the issued reinforcing material on said mandrel during movement thereof, (e) means for causing relative rotation between said winding stages and said mandrel to enable winding of said reinforcement material on said mandrel during movement thereof, (f) individual winding stage drive means operatively associated with certain of said successive winding stages, (g) mandrel feeding drive means to enable feeding of said mandrel past said successive winding stages, (h) disc means operatively rotating in effective relationship to said mandrel feeding drive means and in relationship to said winding stage drive means, said disc means having a cam shape effectively representative of an unfolded shape of said tapered mandrel outer surface, (i) and sensor means operatively associated with said disc means to adjust the rate of application of the reinforcing material to the movement of said mandrel to vary the angle of application of the reinforcing material to the mandrel, whereby said reinforcing material may be matrix cured and removed from said mandrel to produce said tubular product.

22. An apparatus for producing a reinforced plastic tubular product having a tapered shape, said apparatus comprising:

(a) frame means, (b) a plurality of successive winding stages operatively mounted on said frame means, each of said winding stages having a plurality of rotatable discs, (c) a plurality of spools of filament containing reinforcing material mounted on each said disc in close proximity to the periphery of each said disc and being substantially equidistantly spaced apart from each other, said spools on each of said winding stages capable of issuing the reinforcing material therefrom, (d) means for moving a mandrel having a tapered shape equivalent to that of the product to be produced past said successive winding stages in order to wind the issued reinforcing material on said mandrel during movement thereof, each of said winding stages being closely spaced to each other relative to the movement of the mandrel passing said winding stages, (e) means for causing rotation of said winding stages relative to said mandrel to enable winding of said reinforcing material on said mandrel during movement thereof, (f) funnel means associated with each spool to receive the reinforcing material therefrom, (g) guide means to receive the reinforcing material from each funnel means and guiding same for application to said mandrel and to enable said material to be wound on said mandrel to form a conically shaped section directed rearwardly with respect to movement of the mandrel, (h) means for applying a liquid resin matrix in relation to one of said successive winding stations into a conically shaped section as formed, said resin matrix being applied in an amount such that the resin matrix overflows a relatively dense portion of reinforcing material through opened areas between the reinforcing material beyond said dense portion so that the resin matrix may flow toward a conically shaped area formed by reinforcement material from a next succeeding winding stage, (i) and means for applying a shrinkage tape to the reinforcing material on said mandrel, whereby said reinforcing material may be matrix cured and removed from said mandrel to produce said tubular product.

23. The apparatus of claim 22 further characterized in that said resin matrix is applied in a sufficient amount so that the resin matrix will overflow each conically shaped area thus formed to the next succeeding conically shaped area formed by the reinforcing material from each of the successive winding stages.

* * * * *